(12) United States Patent
Huang et al.

(10) Patent No.: US 6,663,908 B2
(45) Date of Patent: Dec. 16, 2003

(54) PROCESS FOR PRODUCING DRIED MEAT

(75) Inventors: Shu-Cheng Huang, Hsinchu (TW); Ping-Yang Chang, Hsinchu (TW)

(73) Assignee: Food Industry Research and Development Institute, Hsinchu (TW)

( * ) Notice: Subject to any disclaimer, the term of this patent is extended or adjusted under 35 U.S.C. 154(b) by 277 days.

(21) Appl. No.: 09/790,475

(22) Filed: Feb. 22, 2001

(65) Prior Publication Data

US 2002/0054945 A1 May 9, 2002

(30) Foreign Application Priority Data

Nov. 9, 2000 (TW) ........................................ 89123721 A

(51) Int. Cl.7 ................................................ A23L 1/31
(52) U.S. Cl. ........................ 426/513; 426/518; 426/641; 426/644; 426/645
(58) Field of Search ................................ 426/513, 645, 426/641, 644, 518

(56) References Cited

U.S. PATENT DOCUMENTS

| | | | | |
|---|---|---|---|---|
| 4,265,918 A | * | 5/1981 | Kueper et al. | 426/264 |
| 4,868,002 A | * | 9/1989 | Scaglione et al. | 426/641 |
| 6,348,225 B1 | * | 2/2002 | Stadler et al. | 426/513 |
| 6,383,549 B1 | * | 5/2002 | Agostinelli | 426/513 |

OTHER PUBLICATIONS

Joy of Cooking, 1975, p. 814.*

* cited by examiner

*Primary Examiner*—Lien Tran
(74) *Attorney, Agent, or Firm*—Fish & Richardson P.C.

(57) ABSTRACT

A process for producing dried meat is disclosed. First, a raw meat is sliced into a sliced meat having a thickness less than 1 cm. Then, the sliced meat is allowed to release salt soluble protein in an amount of 1.5 to 5.5 wt % of the total weight of the sliced meat. Then, the sliced meat is reformed into a reformed meat loaf. Finally, the reformed meat loaf is frozen, sliced, dried, and baked to obtain a reformed dried meat. The manual cost can be effectively saved and the chance of pollution can be reduced. Also, the obtained reformed dried meat has fibrous properties, and the appearance and eating quality are very close to those of the dried meat product obtained from conventional processes.

10 Claims, No Drawings

PROCESS FOR PRODUCING DRIED MEAT

BACKGROUND OF THE INVENTION

1. Field of the Invention

The present invention relates to a process for producing a dried meat, and more particularly to a process for producing a dried meat by means of controlling the sliced meat thickness and released salt soluble protein amount.

2. Description of the Prior Art

Dried pork is a conventional processed meat product in Taiwan, which is made of complete sliced meat and is a semi-dry (IMF) product of a regular thin rectangular shape. Dried pork has complete fibrous properties, medium biting properties (not too soft or hard), nice seasoning, and is very delicious. Therefore, it is very popular to Chinese, Japanese, and other foreigners, and is a product with a lot of potential. However, in the dried pork production process, there are time-consuming and labor-consuming procedures, i.e., spreading the sliced meat on plates by hand, which also easily result in product contamination. Therefore, there is a need to improve the process.

Conventionally, the process for producing dried pork is as follows: pork hind leg→slicing (about 3 to 5 mm thick) →seasoning (overnight)→spreading the sliced meat on a plate (such that the sliced meat is connected to each other and no crevice is formed)→hot air drying (55 to 60° C. for 3 hours)→cutting (about 10 cm×10 cm)→baking →packaging. In this process, the spreading procedure is conducted manually, in this way, the soft sliced meat can be connected to each other to form a large sheet of meat. The spreading procedure is very time-consuming and labor-intensive. Generally speaking, a skillful operator can only complete the spreading of 8 kilograms of raw meat per hour. Thus, we can calculate from this that the spreading cost is as high as approximately US$ 0.75 for each kilogram of dried meat product. In addition, manual operation causes product contamination easily.

Some people have tried to improve the conventional dried meat production process by means of a reforming technique. However, they use minced meat or meat loaf with a large size as a raw material. The obtained reformed dried meat is either hard in texture and without fibrous properties or with inferior cohesion and tears easily, which is a considerable difference from conventional dried meat products.

SUMMARY OF THE INVENTION

Therefore, the object of the present invention is to solve the above-mentioned problems and to provide a process for producing a dried meat, in which the processing of the dried meat can be conducted mechanically. This will save the manual cost effectively and reduce the chance of pollution. Also, the obtained reformed dried meat of the present invention has fibrous properties, and the appearance and eating quality are very close to the dried meat product obtained from the conventional process.

To achieve the above object, the process for producing a dried meat of the present invention includes the following sequential steps:

(a) slicing a raw meat into a sliced meat having a thickness less than 1 cm;

(b) allowing the sliced meat to release salt soluble protein, the salt soluble protein being in an amount of 1.5 to 5.5 wt % of the total weight of the sliced meat;

(c) reforming the sliced meat into a reformed meat loaf, and freezing the reformed meat loaf to a temperature equal to or lower than −18° C.; and (d) subjecting the frozen reformed meat loaf to slicing, drying, and then baking to obtain a reformed dried meat.

DETAILED DESCRIPTION OF THE INVENTION

The key techniques of the present invention are to control the thickness of the sliced meat and to control the released salt soluble protein amount of the sliced meat. These two key techniques should be adjusted to an optimal condition to make the reformed meat not tear during slicing, to make the meat product after drying and baking have adequate cohesion, and to make the meat product have fibrous and biting property and smooth appearance. Thus, according to the present invention, the reformed dried meat can be produced mechanically, and the dried meat product of the present invention is very close to the conventional dried meat product both in quality and in appearance.

According to the present invention, the species of the raw meat is not limited, which can be pork, beef, or mutton. The raw meat is preferably sliced into a sliced meat having a surface area of larger than 2 $cm^2$ in order to have better results.

The present invention uses a method of adding an edible salt into the sliced meat to make the sliced meat release salt soluble protein. Suitable edible salt can be sodium chloride, potassium chloride, or sodium polyphosphate, which can be used singly or in combination. In order to make the sliced meat have a better flavor, at the same time of adding the edible salt, seasoning can be added into the sliced meat, and then the sliced meat may be preserved for a period of time. The so-called preserving is that the sliced meat with a seasoning is placed at a temperature of −4° C. to room temperature for a period of time (for example, several minutes or several hours).

In order to make the sliced meat release the salt soluble protein more easily, after the edible salt and seasoning are added to the sliced meat, the sliced meat can be stirred or tumbled, and then preserved. Preferably, intermittent stirring or tumbling is conducted. That is, after the sliced meat is stirred or tumbled for a period of time, the sliced meat is held still for a period of time, then stirring or tumbling is conducted again for a period time, then the sliced meat is held still again for a period time. The stirring and holding still are recycled in this way. The number of times it is recycled and the length of time of stirring/holding still should be adjusted according to the meat thickness and the type of stirring or tumbling device. In principle, 1.5 to 5.5% of salt soluble protein based on the weight of the meat should be released without excessively deteriorating meat fiber. For example, a preferable stirring way is to stir or tumble the sliced meat for 5 to 10 minutes, hold the sliced meat still for 2 to 10 minutes, and repeat this 3 to 15 times. The total time of stirring or tumbling and holding still can be 24 minutes to 3 hours, preferably 40 minutes to 1.5 hours.

In order to make the reformed meat loaf easy to slice, the reformed meat loaf should be frozen to a temperature equal to or lower than −18° C. and then be sliced, dried, and baked to obtain a reformed dried meat. The drying and baking conditions are determined by the thickness that the reformed meat loaf is sliced into. Preferably, the reformed meat loaf is sliced into 3 to 6 mm, drying is conducted at 50–60° C. for 3 to 4 hours, and baking is conducted at 180–200° C. For 1 to 4 minutes.

The process of the present invention can be conducted mechanically, which reduces the manual cost (US$ 0.75 manual labor cost can be saved for each kilogram of product), increases the product output, and enhances the homogeneity of product quality.

By means of the process of the present invention, the manual cost can be effectively saved, and the amount of pollution can be reduced. Also, the obtained reformed dried meat of the present invention has fibrous properties, and the appearance and eating quality are very close to those of the dried meat product obtained from conventional processes.

The following examples are intended to illustrate the process and the advantages of the present invention more fully without limiting its scope, since numerous modifications and variations will be apparent to those skilled in the art.

EXAMPLE 1

Frozen pork ham in which the tendons and membranes had been removed was sliced into 0.5 cm thick (size=10 cm×10 cm). After the sliced meat was allowed to warm to −2° C. to −4° C., seasoning substances (sugar, water, salt, monosodium glutamate (MSG), soy sauce, phosphate, nitrite, colorants, and spices) were added into the sliced meat and mixed in a pedal-type mixer. The mixing condition was that after the sliced meat was stirred for 7 minutes, it was held still for 3 minutes, which is called one cycle. In total 7 cycles were conducted. The salt soluble protein amount released was determined as 2.1%.

Then, the supple sliced meat was stuffed into a food casing (diameter=10 cm) to form a desired shape, and then was frozen to −18° C. After the casing was removed, the reformed meat loaf was sliced into 4 mm thick meat (the temperature was still holding below −16° C.). The sliced meat maintained a complete shape and did not tear during slicing. Then, the sliced meat was placed on a perforated stainless iron plate, and was hot air dried at 60° C. for 3 hours. Finally, the sliced meat was baked at 200° C. for 2 minutes to obtain a reformed dried meat product. During the drying and baking procedures, the sliced meat maintained a complete shape and did not tear.

EXAMPLE 2

The same procedures were employed as described in Example 1, except that the raw meat was of a size of about 2 cm×2 cm and 5 cycles of stirring were conducted. The salt soluble protein amount released was determined as 1.7%.

Then, the sliced meat was subjected to reforming, freezing, food casing removing, slicing, drying and then baking according to the same procedures as described in Example 1 to obtain a reformed dried meat product. During the drying and baking procedures, the sliced meat maintained a complete shape and did not tear.

EXAMPLE 3

The same procedures were employed as described in Example 1, except that the raw meat was in a thickness of 0.8 cm and in a size of about 4 cm$^2$, and 7 cycles of stirring were conducted. The salt soluble protein amount released was determined as 3.0%.

Then, the sliced meat was subjected to reforming, freezing, food casing removing, slicing, drying and then baking according to the same procedures as described in Example 1 to obtain a reformed dried meat product. During the drying and baking procedures, the sliced meat maintained a complete shape and did not tear.

EXAMPLE 4

The same procedures were employed as described in Example 1, except that the raw meat was in a thickness of 0.8 cm and of a size of about 150 cm$^2$, and 10 cycles of stirring were conducted. The salt soluble protein amount released was determined as 4.6%.

Then, the sliced meat was subjected to reforming, freezing, food casing removing, slicing, drying and then baking according to the same procedures as described in Example 1 to obtain a reformed dried meat product. During the drying and baking procedures, the sliced meat maintained a complete shape and did not tear.

All of the reformed dried meat obtained from the above Examples 1 to 4 had good properties, which was very close to the dried meat obtained by the conventional process. The surface of the reformed dried meat was very smooth and had no crevices. The reformed dried meat did not tear by biting or manual tearing. Also, it had medium biting property (not too supple or hard) and had fibrous properties.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A process for producing a dried meat, comprising the following sequential steps:
   (a) slicing a raw meat into a sliced meat having a thickness less than 1 cm;
   (b) allowing the sliced meat to release salt soluble protein, the salt soluble protein being in an amount of 1.5 to 5.5 wt % of the total weight of the sliced meat;
   (c) reforming the sliced meat into a reformed meat loaf, and freezing the reformed meat loaf to a temperature equal to or lower than −18° C.; and
   (d) subjecting the frozen reformed meat loaf to slicing, drying, and then baking to obtain a reformed dried meat.

2. The process as claimed in claim 1, wherein the raw meat is sliced into a sliced meat having a surface area of larger than 2 cm$^2$.

3. The process as claimed in claim 1, wherein step (b) includes adding an edible salt into the sliced meat such that the sliced meat releases salt soluble protein.

4. The process as claimed in claim 3, wherein the edible salt is selected from the group consisting of sodium chloride, potassium chloride, sodium polyphosphate, and mixtures thereof.

5. The process as claimed in claim 1, wherein step (b) includes adding an edible salt and a seasoning into the sliced meat, and then stirring or tumbling the sliced meat to allow the sliced meat to release salt soluble protein.

6. The process as claimed in claim 5, wherein the sliced meat is subjected to intermittent stirring or tumbling.

7. The process as claimed in claim 6, wherein the intermittent stirring or tumbling is conducted by the steps of (b1) stirring or tumbling the sliced meat for 5 to 10 minutes, and (b2) holding the sliced meat still for 2 to 10 minutes, wherein steps (b1) and (b2) are repeated 3 to 15 times.

8. The process as claimed in claim 7, wherein the total time of the stirring or tumbling and holding still is 24 minutes to 3 hours.

9. The process as claimed in claim 8, wherein the total time of the stirring or tumbling and holding still is 40 minutes to 1.5 hours.

10. The process as claimed in claim 1, wherein in step (d), the reformed meat loaf is sliced into 3 to 6 mm, drying is conducted at 50–60° C. for 3 to 4 hours, and baking is conducted at 180–200° C. for 1 to 4 minutes.

* * * * *